United States Patent [19]

Gill

[11] Patent Number: 5,364,212
[45] Date of Patent: Nov. 15, 1994

[54] FASTENING MEMBER HAVING THREADS, PARTICULARLY A SCREW AND SCREWING TOOL

[75] Inventor: Peter J. Gill, Wolverhampton, Great Britain

[73] Assignee: Richard Bergner GmbH & Co., Schwabach, Germany

[21] Appl. No.: 117,018

[22] PCT Filed: Dec. 22, 1993

[86] PCT No.: PCT/DE92/01078

§ 371 Date: Sep. 3, 1993

§ 102(e) Date: Sep. 3, 1993

[87] PCT Pub. No.: WO93/13323

PCT Pub. Date: Jul. 8, 1993

[30] Foreign Application Priority Data

Jan. 4, 1992 [GB] United Kingdom ............... 9200093

[51] Int. Cl.$^5$ ............... F16B 23/00; F16B 35/06; B25B 23/00
[52] U.S. Cl. ............... 411/404; 411/919; 81/460
[58] Field of Search ............... 411/403, 404, 406, 407, 411/919; 81/460

[56] References Cited

U.S. PATENT DOCUMENTS

| 2,046,343 | 7/1936 | Phillips . | |
| 2,402,342 | 6/1946 | Phillips | 411/404 |
| 2,445,525 | 7/1948 | Gulden . | |
| 2,764,197 | 9/1956 | Torresen | 411/404 X |
| 3,575,080 | 4/1971 | Hannay | 411/404 |

FOREIGN PATENT DOCUMENTS

| 2314645 | 1/1977 | France . |
| 3911409A1 | 10/1990 | Germany . |
| 2027151A | 2/1980 | United Kingdom . |

OTHER PUBLICATIONS

Julius Soled, P. E., *Fasteners Handbook*, 1957, p. 111, Chapter Entitled "Screws, Bolts and Studs", Reinhold Publishing Corp.

*Primary Examiner*—Neill R. Wilson
*Attorney, Agent, or Firm*—Spencer, Frank & Schneider

[57] ABSTRACT

A threaded fastening member includes an actuating end having a head. The head has a diameter projecting beyond a diameter of the thread of the fastening member and is coaxial with a thread axis. A centrally located recess is provided within the head for the application of interior forces. The recess includes radial outwardly projecting slots, each having two flanks lying in respective planes. Each flank plane is essentially tangential to an imaginary cone that is co-axial with the thread axis. The recess further includes a pair of segmented circumferential faces separating each slot from an adjacent slot, and a transitional linear inner edge formed between each pair of segmented circumferential faces and each flank of a respective slot. Each inner edge converges towards a common point on the thread axis at a position within the fastening member, and each face of each pair is inclined relative to the other face of the pair at an angle, whereby the inner edges define the radially innermost limits of the recess and are for the reception of the interior forces.

9 Claims, 5 Drawing Sheets

FASTENING MEMBER HAVING THREADS, PARTICULARLY A SCREW AND SCREWING TOOL

BACKGROUND OF THE INVENTION

The invention relates primarily to a threaded fastening member including an actuating end having a head, the head having a diameter projecting beyond a diameter of the thread of the fastening member and being coaxial with a thread axis; and a centrally located recess within the head for the application of interior forces.

The recesses of these types of prior art screws which are intended for the application of force from the interior, are configured symmetrically. Their axis of symmetry is the axis of the screw thread. The recesses of known screws of this type have different shapes. They may be cruciform, hexagonal, square, rectangular or circular with notched toothing, wedge-shaped toothing or arcuate toothing.

It is known that significant improvements in securing screws against loosening and with respect to their fatigue strength are obtained if they are pre-tensioned to the highest possible level of their pre-tensioning force, i.e., approaching the force at which their shank would break. This high pre-tensioning force cannot be realized with many of the known types of force application to a screw, because the tightening torque is limited. This torque limitation, for example, has the following mechanical causes: reaming of the interior-force application zone, severing of the head due to insufficient strength of the material between the head and the transition to the shank and the base of the interior-force application zone, and breakage of the screwing tool.

One important cause for the limit of the pre-tensioning force of conventional screws of this type is also that the screwing tool, due to axial forces during the assembly process, is pushed axially out of its force application zone. This cam-out effect is the result of a succession of reactive forces between the screwing tool and the force application zone, i.e., in the last analysis, it is the result of the screw torque that is applied.

A further drawback of most configurations of interior-force application zones for a screw is that different tools are required for screwing in different nominal diameters. For example, for mounting many different types of conventional Phillips screws having a nominal diameter ranging from 1.6 to 10 mm, five different sizes of screwdrivers are required. Frequently, each size of screw requires a screwdriver whose size specifically matches the screw.

SUMMARY OF THE INVENTION

It is an object of the invention to provide fastening members, particularly, screws of the above-mentioned type, with a novel geometry of the screw's recess for the application of force from the interior, such that the axial reactive forces are minimized, even if very high torque is applied during the screwing process. This makes it possible for the screwdriver to generate a pre-tensioning force that comes close to the force under which the screw shank would break. This problem is solved by the provision of a recess comprising radial outwardly projecting slots each having two flanks lying in respective planes, each flank plane being essentially tangential to an imaginary cone being co-axial with the thread axis; a pair of segmented circumferential faces separating each slot from an adjacent slot; and a transitional linear inner edge formed between each pair of segmented circumferential faces and each flank of a respective slot, wherein each inner edge converges towards a common point on the thread axis at a position within the fastening member, and each face of each pair is inclined relative to the other face of the pair at an angle, whereby the inner edges define the radially innermost limits of the recess and are for the reception of the interior forces.

Axial reactive forces are prevented on account of this solution. A further advantage is that this geometry of the interior-force application zone may be used in the same manner for screws of any size, so that all screws may be tightened with the same screwing tool.

To facilitate the realization of the above object with respect to manufacturing technology, the interior edges forming the transition from the slot flanks to the segment-like peripheral surfaces of the central recess are in their desired position independent of the angle they form together with the axis of the thread.

An essential feature of the above is that each of the afore-mentioned interior edges lies in an imaginary plane which contains the thread axis and thus is spaced radially from this projecting imaginary plane. This must be the case with respect to the entire planar slot flanks. However, manufacturing technology does not allow for the production of such an ideal form at acceptable cost. The recesses of screws intended for interior-force application are conventionally manufactured by means of non-cutting deformation, namely, pressing. The principal direction of pressing, in this case, extends in the direction of the thread axis. In order to be able to remove the pressing tool from the formed recess in this conventional manufacturing method, the slot flanks must not be aligned precisely parallel to the thread axis. The slope angles of the individual slot flanks employed here, which are in the range of 1.5° to 2° and, with respect to the thread axis, are generally essentially negligible with respect to the desired prevention of reactive axial forces.

The peripheral surfaces of the central opening lying between the slots are not of great significance for the transfer of torque. However, they must be configured in such a way that they do not prevent the engagement of the tool for transmitting torque and its interaction with the slot flanks.

The angle between the interior edges forming the transition from the slot flanks to the segment-like circumferential faces of the central opening and the axis of the thread may be matched in such a way with the axial length of the screw head that point P lies within the screw head. This ensures increased mechanical strength of the screw.

Point P on the thread axis must not be configured concretely in the appearance of the recess. It may also be an imaginary point of convergence.

A further part of the invention relates to the configuration of the tool head for introducing torque and for transferring the torque to the screw configured according to the invention. The configuration of the circumference of the tool head is generally complementary to the spatial contour of the screw recess. Thus the screwing tool basically has approximately the form of a central body that corresponds to the central opening of the screw with wings projecting radially from the screw axis which, during the screwing process, sink into the slots in the recess of the screw. The central body of the screwdriver, in this case, has approximately the shape of a nose. The characteristics of the screwing tool ensure that the interior edges forming the transition from the slot flanks to the segment-like circumferential faces of the central recess in the circumferential direction of the screw recess are charged by the application of force originating from the screwdriver. Advisably, it is only those interior edges that are subjected to the application of force if the occurrence of axial reactive forces must be significantly suppressed. This advantageous limitation of the force applied by the wings on the screwdriver head is ensured by the configuration of the flanks of the wings on the screwdriver. The flanks of the screwdriver wings must not necessarily be planar in this case. They may even be given a curved shape.

BRIEF DESCRIPTION OF THE DRAWINGS

The invention will now be explained by way of the exemplary embodiments shown in the drawings.

DETAILED DESCRIPTION OF THE PREFERRED EMBODIMENT

Figure 1:
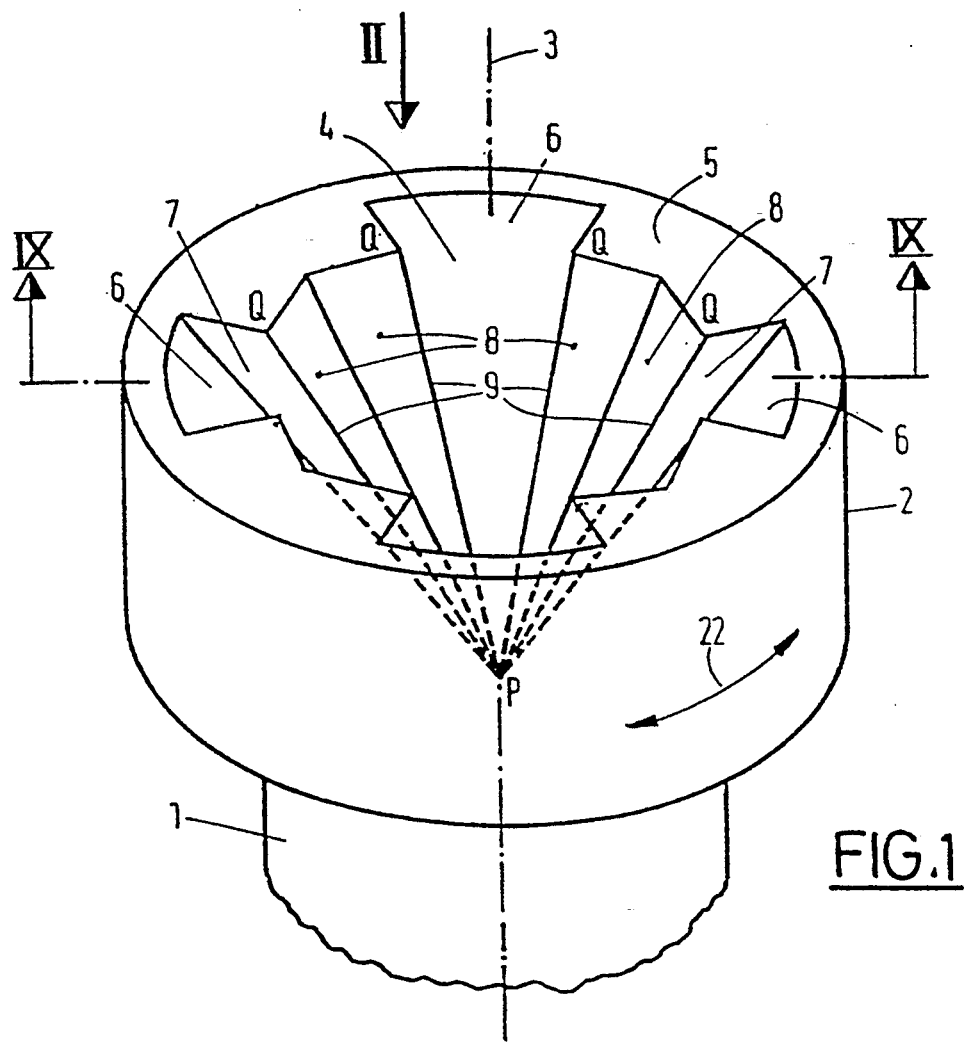
FIG. 1 is the three-dimensional view of a screw having a cylindrical screw head accommodating a recess for the application of force from the interior.

The screw shown in FIG. 1 comprises essentially the screw shank 1 containing the screw thread (not shown) and the screw head 2 forming the activating end of the screw. The thread axis 3 is the axis of symmetry of shank 1 and head 2. A recess, generally designated 4, is made starting from the end face 5 of the screw head. The recess 4 comprises a central opening and radially projecting outwardly slots 6 whose flanks 7 form the surfaces for applying the force to introduce the torque.

Figure 2:
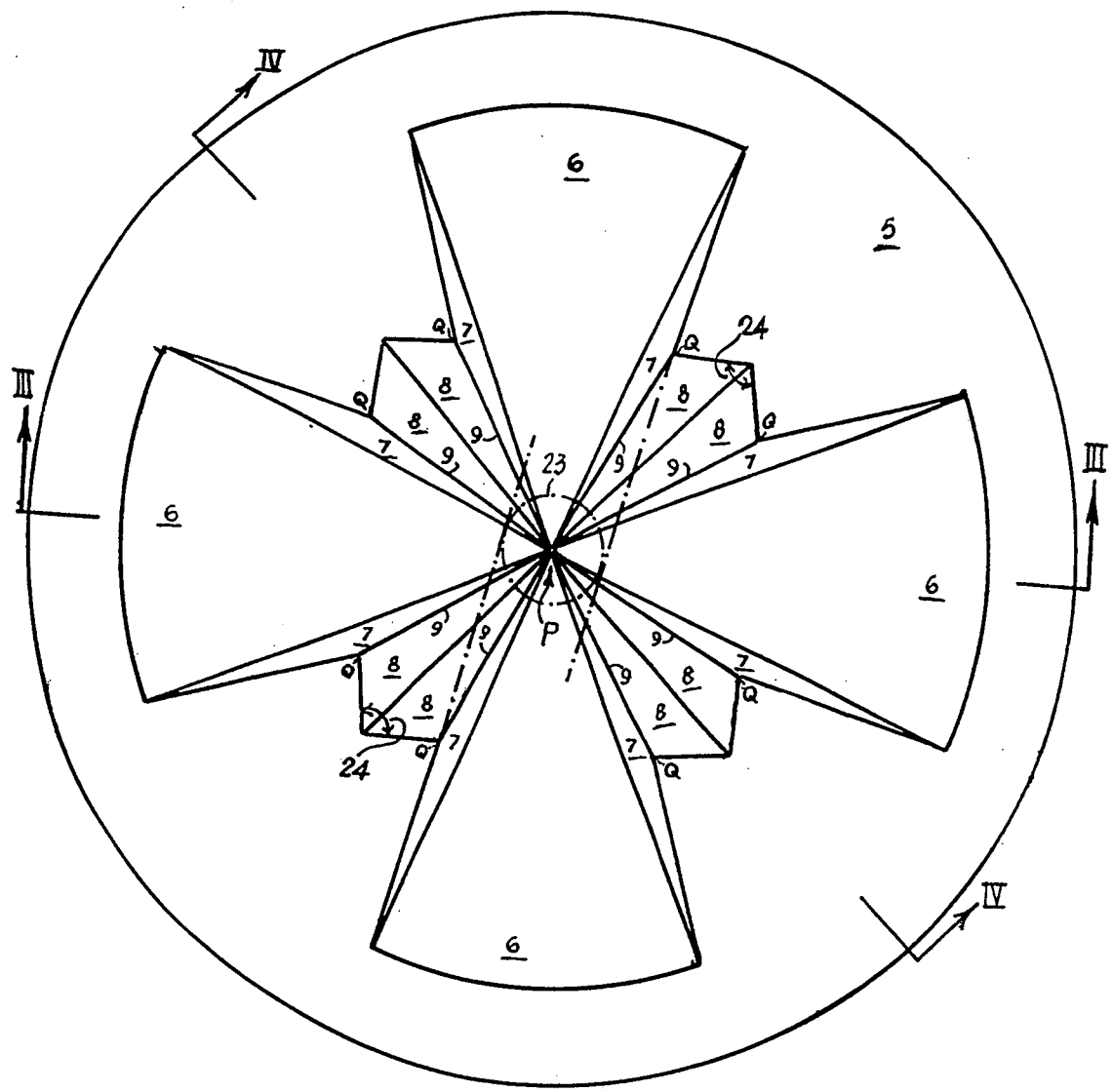
FIG. 2 is a top view, on a smaller scale, of the end face of the screw head viewed in the direction of arrow II in FIG. 1.
Figure 3:
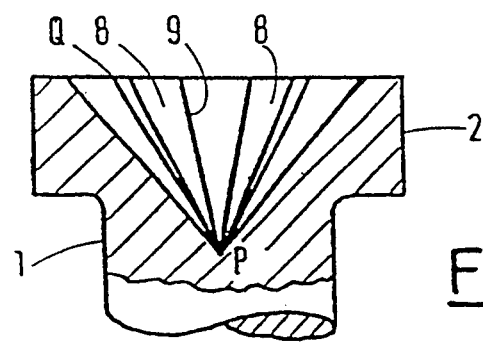
FIG. 3 is a cross section through the screw head corresponding to line III—III in FIG. 2.
Figure 4:
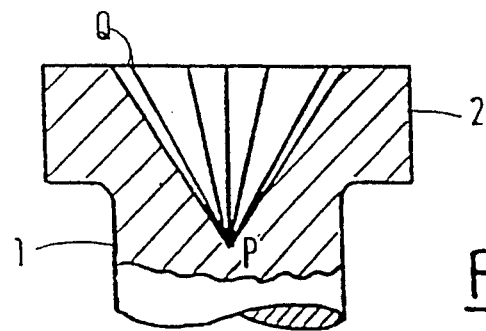
FIG. 4 is a cross section analogous to FIG. 3 and corresponding to section line IV—IV in FIG. 2.

The interior edges 9 which, in the circumferential direction 22, form the transition from the slot flanks 7 to the segment-like circumferential faces 8 of the central opening have a linear configuration. Typically, the segmented circumferential faces 8 are divided into pairs. Each face of each pair is inclined at an angle relative to the other face, so that the interior edges form the radially innermost limits of the recess. Referring also to FIG. 2, the interior edges 9 each extend in an imaginary plane 10 containing the thread axis 3 and thus project radially from the same.

In the direction II away from the end face 5, the interior edges 9 converge in a common point P of thread axis 3.

Figure 6:
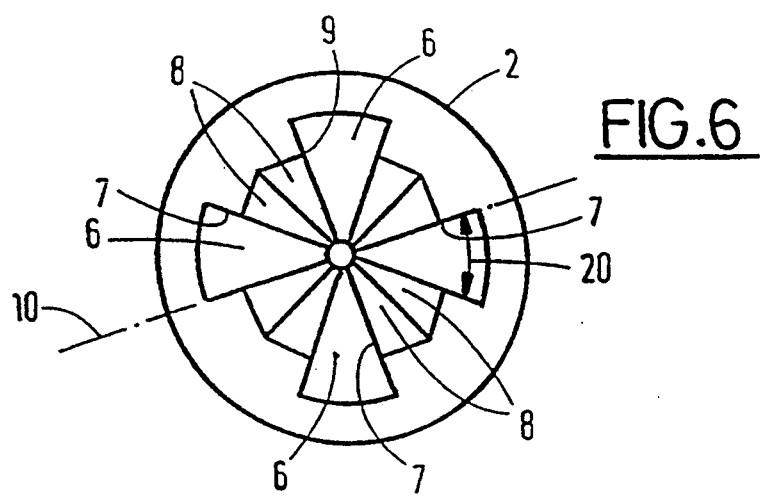
FIG. 6 is a top view in the direction of the thread axis of the recess at the upper end of the head corresponding to the direction of arrow VI in FIG. 5.
Figure 10:
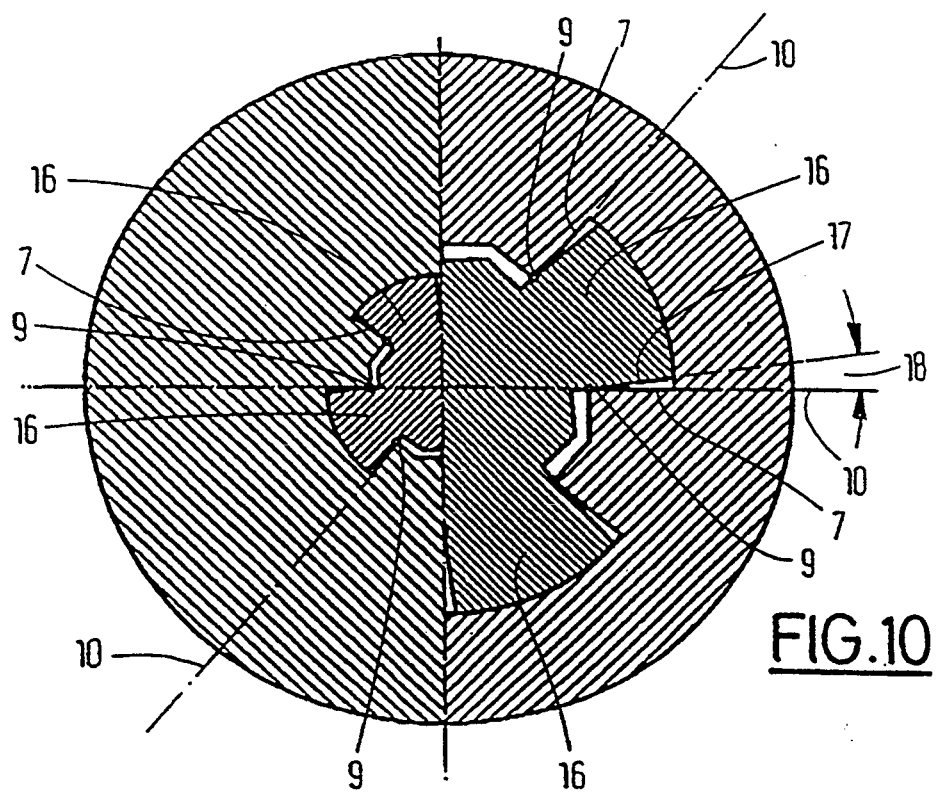
FIG. 10 is a horizontal section corresponding to section line X—X in FIG. 9 through the screw head with a screwdriver head resting in its recess.

As shown in FIGS. 6 and 10, the planar slot flanks 7 in their entirety lie within the imaginary planes 10 containing thread axis 3 and projecting radially from the same.

Alternatively, as illustrated in FIG. 2, the slot flanks 7, which form a common slot 6 between them, converge slightly in the direction II facing away from end face 5 in order to form a lift-out slope on both sides with respect to a shaping tool, so that the screw can be provided with recess 4 without cutting. Measured in the direction of penetration II, the slope angle of the slot flanks 7 relative the central plane of each of the slots 6 containing the thread axis 3, is approximately 1.5° to 2°, and is thus negligibly small with respect to the desired prevention of axial reactive forces. Stated alternatively, each flank 7 lies in a respective plane that is essentially tangential to an imaginary cone 23 that is co-axial to the thread axis and that has a vertex corresponding to common point P. The imaginary cone thus tapers outward away from common point P at an angle of about 1.5 to 2 degrees relative to thread axis 3.

The imaginary planes of all slot flanks 7 also intersect at point P lying on screw axis 3. The point of intersection between the interior edges 9 and the surface 5 of the screw head 2 is designated Q.

Figure 9:
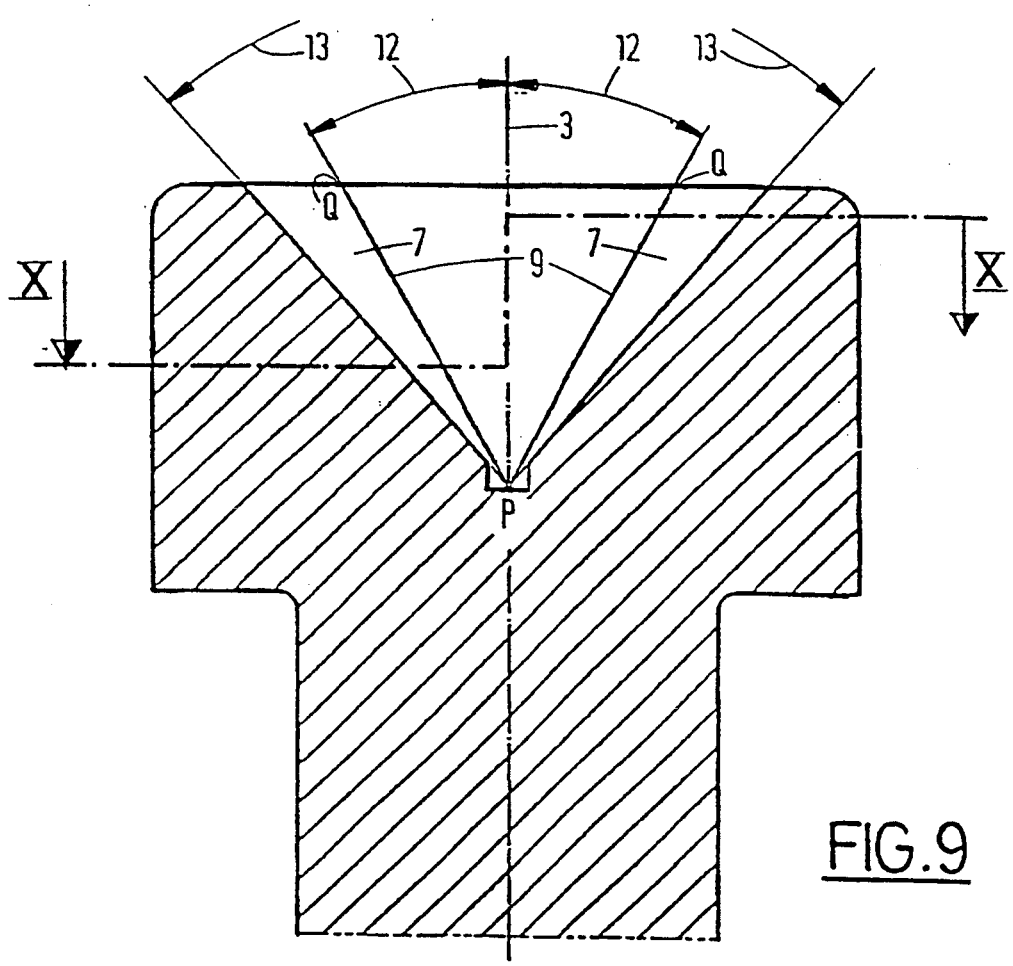
FIG. 9 is a longitudinal section through the screw head corresponding approximately to section line III-—III in FIG. 2.

The circumferential faces 8 of the central opening of the recess lying between slots 6 in circumferential direction 22 are surfaces of an imaginary regular pyramid whose axis coincides with thread axis 3 and whose tip is point P lying on thread axis 3. However, it is also possible without jeopardizing the purpose of the invention, that the circumferential faces 8 lie outside of these surfaces of a pyramid. As illustrated in FIG. 9, the interior edges 9, together with thread axis 3, enclose an angle 12 of approximately 30°, 28° in the exemplary embodiment.

The surfaces of the slots 6 lie on an imaginary cone or imaginary regular pyramid surface, whose axis coincides with thread axis 3, and whose cone tip coincides with point P on axis 3. The angle 13 of the cone tip is shown in FIG. 9.

Figure 5:
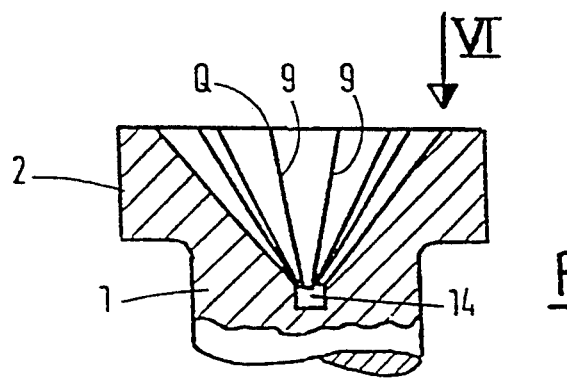
FIG. 5 is a cross section similar to FIG. 3, although with a blind hole at the interior end of the recess.

As illustrated in FIG. 5, point P on thread axis 3 may also lie as an imaginary point on the axis of and in a blind hole 14. Blind hole 14 forms the end at the bottom of the recess 4.

Figure 7:
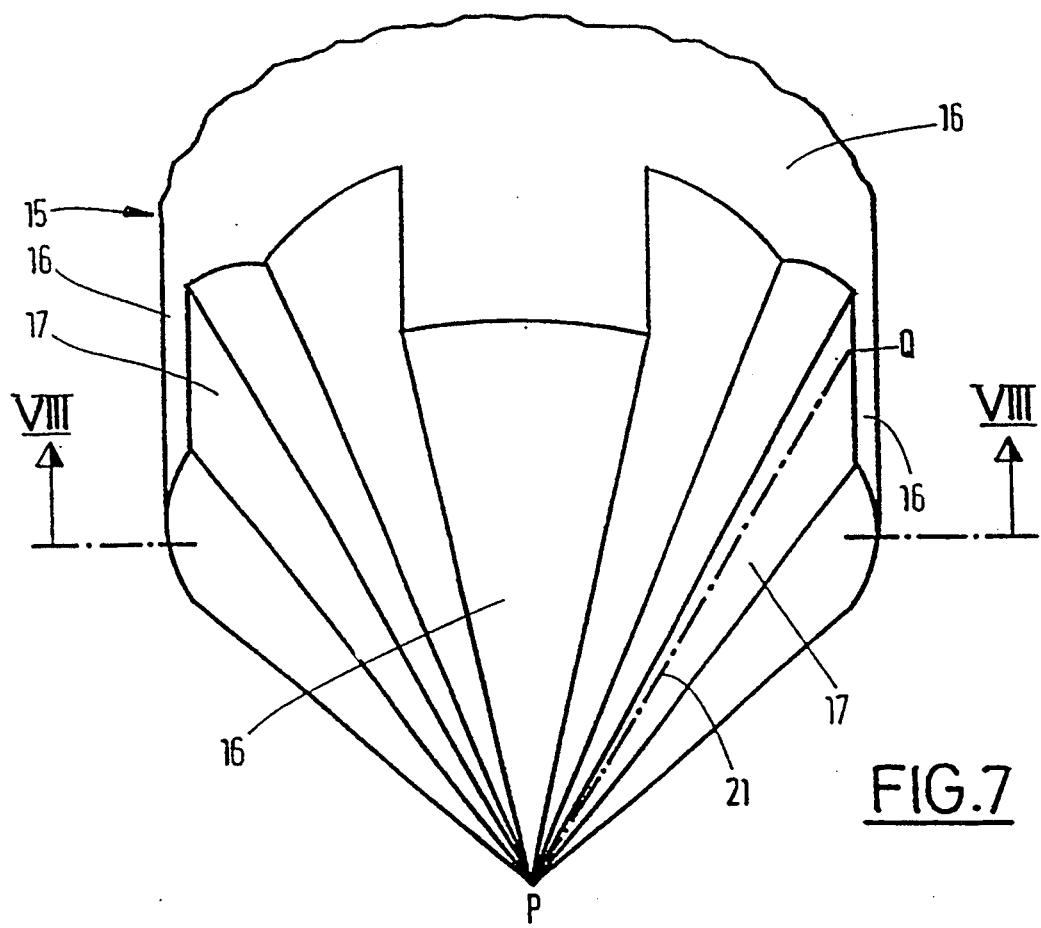
FIG. 7 is a partial perspective view of a screwdriver, suitable for operating the screw head configured according to the invention.

The screwdriver head shown in FIG. 7 essentially shows a surface contour which is complementary to the circumferential contour of recess 4. In the engaged state, as shown in FIG. 10, its wings 16 lie within the slots 6 of recess 4. When inserted into the recess 4 of the screw, wing flanks 17 together with slot flanks 7 of screw recess 4 form an acute angle 18 which closes toward thread axis 3. Angle 18 may be relatively small. It must merely be ensured that a contact between the wing flanks 17 and slot flanks 7 occurs in the region of the interior edge 9 and that it is limited as much as possible to this interior edge region 9. To this end and referring to FIGS. 6 and 8, the wing flanks 17 of each wing 16 advisably enclose an acute angle 19 which closes outwardly substantially in the radial direction whereas the flanks 7 on the screw head 2 forming a common slot 6 form an angle 20 which closes in the direction toward thread axis 3.

Figure 8:
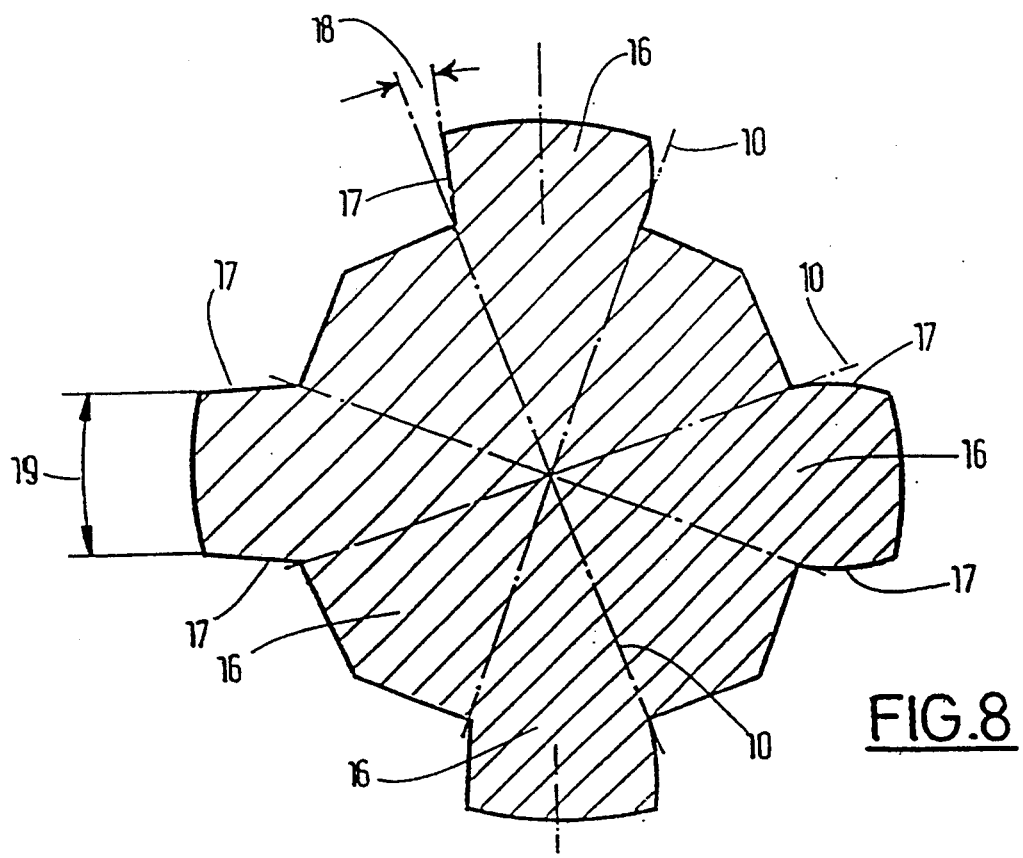
FIG. 8 is a cross-sectional illustration corresponding to section line VIII—VIII in FIG. 7 having different configurations of the wing flanks on the screwdriver head.

The illustration according to FIG. 8 shows in the left half that wing flanks 17 there are planar. However, they may also be configured spherically convex in the same manner. This is illustrated in FIG. 8 on the right side.

While the tool is in use, the wing flanks 17 make contact practically only with the interior edges 9 of the recess 4 in the region of the dashed contact line 21 (FIG. 7) between the end points designated q and p there. The end p of line 21 lies on the screwdriver axis 3 to form the tip of the screwdriver.

I claim:

1. A threaded fastening member including an actuating end having a head, the head having a diameter projecting beyond a diameter of the thread of the fastening member and being co-axial with a thread axis, and a centrally located recess within the head for the application of interior forces, the recess comprising:

radial outwardly projecting slots each having two flanks lying in respective planes, each flank plane being essentially tangential to an imaginary cone being co-axial with the thread axis;

a pair of segmented circumferential faces separating each slot from an adjacent slot; and a transitional linear inner edge formed between each pair of segmented circumferential faces and each flank of a respective slot, wherein each said inner edge converges towards a common point on the thread axis at a position within said fastening member, and each said face of each said pair is inclined relative to the other face of said pair at an angle, whereby said inner edges define the radially innermost limits of said recess and are for the reception of the interior forces.

2. A threaded fastening member as defined in claim 1, wherein a vertex of the imaginary cone corresponds to said common point.

3. A threaded fastening member as defined in claim 1, wherein said imaginary cone tapers outward away from said common point at an angle of about 1.5 to 2 degrees relative to the thread axis.

4. A threaded fastening member as defined in claim 1, wherein all of said flank planes intersect at said common point.

5. A threaded fastening member as defined in claim 1, wherein said circumferential faces coincide to a respective surface of an imaginary, regular pyramid having an axis coinciding with the thread axis, and having a tip corresponding to said common point.

6. A threaded fastening member as defined in claim 1, wherein each slot has a circumferential slot face; further wherein each circumferential slot face coincides to a respective surface of one of an imaginary, regular pyramid and an imaginary cone having an axis coinciding with the thread axis, and having a tip on the thread axis.

7. A threaded fastening member as defined in claim 1, further comprising a blind hole coaxial to the thread axis and forming a bottom of the centrally located recess, said common point being within said blind hole 8. A tool in combination with the threaded fastening member as defined in claim 1, comprising wings having flanks, and having a surface contour that is essentially complementary to a circumferential contour of the recess, said tool engaging said recess in a form-locking manner and being for the application of the interior forces.

9. A tool as defined in claim 8, wherein each said wing flank forms an acute angle with a respective one of said slot flanks when said tool is engaged in said recess, the acute angle closing in a direction towards the thread axis and having a vertex defined by a linear contact between the respective inner edge and said wing flank.

* * * * *